Figure 1:
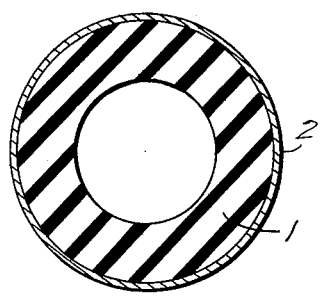

INVENTORS
Rudolf Kern
Hans Scheurer
BY and Georg Ultsch

Michael S. Striker
Attorney

United States Patent Office 3,002,840
Patented Oct. 3, 1961

3,002,840
ANTI-TACK COMPOSITION
Rudolf Kern, Neustadt (Weinstrasse), Hans Scheurer, Heidelberg-Schlierbach, and George Ultsch, Munich, Germany, assignors to Rhein-Chemie G.m.b.H., Mannheim-Rheinau, Germany
Filed Feb. 26, 1959, Ser. No. 795,802
14 Claims. (Cl. 106—2)

The invention relates to an anti-tack composition, its use, and to articles treated therewith.

Anti-tack agents are commonly employed in the rubber and plastics industry in order to prevent adhesion of rubber or plastic objects to themselves, to each other and/or to other objects. When a plurality of rubber and plastic articles are placed contiguously adjacent each other or particularly when they are stacked, they tend to adhere to each other and cannot be separated without much effort and sometimes without damage to the articles. Just the same effect results if articles of rubber or polymeric materials are rolled up or folded, whereby the surfaces of the same article are in mutual contact. This behavior of adhesion is common to many elastomers and to many types of plastics, but it is particularly severe in objects made from unvulcanized rubber and from certain plastics containing a very high percentage of plasticizers, such as highly plasticized polyvinyl chloride.

To prevent such adhesion of rubber or plastic articles to themselves or to each other, it is common to employ so-called anti-tack compositions which are usually powdery materials such as talcum, zinc stearate, or aluminum stearate which are applied to the rubber or plastic material or articles. While such powdery anti-tack agents and compositions appear effective in preventing adhesion of the above mentioned materials to themselves or to each other, such powdery materials have serious shortcomings.

No convenient method has yet been found for dusting elastomeric or plastic articles on a large production scale by mechanical equipment. It is therefore necessary to employ a substantial amount of hand labor for applying the anti-tack compositions. Powdery materials cannot be applied without spreading dust over the entire working area and over the machinery employed. These anti-tack compositions of the prior art furthermore leave a grayish coating on the surface of the treated article and have therefore to be removed by washing or similar operations when the surface appearance of the object is of importance. Obviously such coatings are particularly visible on dark colors and particularly on black objects such as are frequently produced from vulcanized rubber.

It is therefore a primary object of the present invention to provide an anti-tack composition which safely prevents adhesion of superimposed or contiguously adjacent surfaces of elastomeric or plastic material while avoiding the shortcomings of the anti-tack compositions now known.

Another object is the provision of such an anti-tack composition which is completely free from dust in the application thereof.

Yet another object is the provision of such an anti-tack composition which does not impair the surface appearance of the objects treated therewith.

A further object is the provision of an anti-tack composition which does not interfere with subsequent operations to which the elastomeric or plastic article may be subjected and does not interfere with the ultimate use of the article so that the anti-tack composition need not be removed after having been applied.

A still further object is the provision of an anti-tack composition which is non-toxic and harmless to the workers and which is substantially free from causing allergic side effects.

An additional object is the provision of an anti-tack composition which has improved wetting properties so as to act as a convenient coolant on freshly shaped hot elastomeric or plastic objects and to stabilize their shape.

With these and other objects in view, the invention provides a water-soluble anti-tack composition comprising as active ingredients at least one water-soluble salt of a fatty acid having between 8 and 30 carbon atoms and at least one water-soluble salt of carboxymethyl cellulose.

Preferred fatty acid salts are those of the alkali metals, of ammonium and of the alkaline organic substitution products of ammonium, that is amines and substituted amines.

While soap solutions have been variously recommended as anti-tack agents, they are relatively inefficient and it was entirely unexpected that addition of carboxymethyl cellulose to a soap solution would substantially improve the anti-tack effect of the soap so as to yield an anti-tack composition which is equal or superior in anti-tack properties to the aforementioned powdery anti-tack agents. Carboxymethyl cellulose, while not a satisfactory anti-tack agent by itself, was found to have a specific effect in such a combination with soap, an effect which cannot be duplicated by other water-soluble film-forming agents such as polyvinyl alcohol, simple cellulose ethers such as methyl cellulose, alginates, starch, and the like.

It has been found that the anti-tack effect is quite independent of the cation which is combined with a fatty acid anion to form a soap, and a wide variety of cationic components may be combined with the fatty acid anion. It is important though that the resulting soap be soluble in water in the presence of carboxymethyl cellulose. Cationic components which satisfy these requirements include the alkali metals, ammonia, and its substitution products. No appreciable difference in effectiveness is observed between these various cationic components. The length of the fatty acid chain also is not of significance as long as the carbon chain of the fatty acid anion contains at least 8 carbon atoms. The upper limit of chain length appears to be set by considerations of solubility and practicability. Soaps having as many as 24 carbon atoms in the anionic portion of the molecule are entirely satisfactory, and it would appear that the length of the carbon chain in the fatty acid is not significant beyond 7 carbon atoms. For practical reasons, the upper limit may be set at 30 carbon atoms.

It has also been found that the cationic element replacing the reacted hydrogen atom in carboxymethyl cellulose is without effect on the anti-tack properties of the composition prepared from such carboxymethyl cellulose. Sodium and potassium are fully equivalent, and the presence of various other cationic elements introduced with the soap into the composition appears not to influence the effect of the carboxymethyl cellulose. The viscosity of the carboxymethyl cellulose, however, is important. Carboxymethyl cellulose having a viscosity of 500 centipoise or higher was found to be less satisfactory than carboxymethyl cellulose of lower viscosity. Equally there exists a lower limit below which a satisfactory film cannot be formed. This lower limit is at approximately 15 centipoise. The viscosity values given throughout this specification and the claims are based on determination in an aqueous solution containing 2% of the material and were measured at 25° C. by the method of Hoeppler.

Best results are obtained by jointly using two carboxymethyl cellulose fractions, namely one of very low viscosity of 15 to 50, and preferably of substantially 27 centipoises, and another fraction having a viscosity of 150 to 500 centipoises and preferably of substantially 260 centipoises. These two fractions are preferably mixed in equal proportions for the highest anti-tack effect.

The ratio of the fatty acid salt to the carboxymethyl cellulose is preferably of the order of at most 15:1 and at least 5:3. Since the cationic component in the soap molecule appears to be of subordinate importance, this ratio is to be understood on the basis of equivalent fatty acid contained in the fatty acid salt, relative to the carboxymethyl cellulose salt, the difference between the sodium and the potassium salt not being of importance. Preferably, the ratio of the fatty acid salt expressed in parts of the fatty acid equivalent to the carboxymethyl cellulose salt is between the values of 5:1 and 7:1.

The anti-tack composition of the invention may be prepared as a substantially dry mixture of the active ingredients. Such a dry mixture is shipped to a distant place of application at minimum cost. It is preferred though to prepare an aqueous concentrate of the carboxymethyl cellulose salt and of the fatty acid salt. Such a concentrate is more readily prepared and is more convenient to use. It can be simply mixed with water to the desired concentration, whereas the dry product requires more complex steps to transform it into the desired dilute aqueous solution because of the dissolution characteristics of carboxymethyl cellulose.

Carboxymethyl cellulose when treated with water swells by gradually absorbing increasing amounts of water and then forms a clear dispersion in the water. Without any reference to the specific nature of the mixture of water and carboxymethyl cellulose, such mixtures will be referred to in this specification and in the claims as a "solution" and it will be understood that this term also includes dispersions of carboxymethyl cellulose in the water in other than molecular distribution.

The preferred concentrate of the invention contains 15 to 35% by weight of the active ingredients, the weight of the carboxymethyl cellulose salt being expressed as such, and the weight of the fatty acid salt being expressed as the weight of the equivalent amount of fatty acid.

Whether the anti-tack composition of the invention is prepared from a dry mixture, from an aqueous concentrate, or is directly prepared from the ingredients as a dilute solution ready for use, it is employed preferably as a dilute aqueous solution containing substantially 0.3 to 7% by weight of the active ingredients. This total amount comprises 0.2 to 6% of the fatty acid equivalent of the soap, and 0.1 to 1.0% of the carboxymethyl cellulose salt, and preferably 2 to 4% of the fatty acid and 0.3 to 0.8% of the carboxymethyl cellulose salt.

The dilute aqueous solution of the anti-tack composition of the invention is applied to the surface of an elastomeric or a plastic article which otherwise would tend to adhere to itself, to another article of the same type, or even to a surface of a different material, by any convenient method, such as by brushing, by spraying or by dipping. If the water in which the solid active ingredients are dissolved does not evaporate during application, such as in spraying, the coated article is either permitted to airdry, or drying may be hastened by blowing hot air against the surface. Evaporation of water leaves behind a very thin invisible film of slightly hygroscopic material which has been found extremely effective in preventing sticking of superimposed layers of such tacky materials as unvulcanized rubber, highly plasticized polyvinyl chloride, and the like.

If the material is applied by dipping or other immersion processes, its excellent wetting properties permit the coating vats to act simultaneously as an excellent cooling bath.

This mode of application is preferably employed where the coating of the invention is applied to extruded material, such as rubber hose and other extruded shapes of non-vulcanized rubber compositions. The extrudate is continuously lead from the extrusion nozzle through a tank holding a quantity of dilute solution of anti-tack composition in which the extrudate is cooled and coated as it leaves the solution. Warm air is then directed against the extruded material to dry the anti-tack composition to a solid film.

Examples of objects coated with the anti-tack composition of the present invention are illustrated in the attached drawing by way of example.

Figure 2:
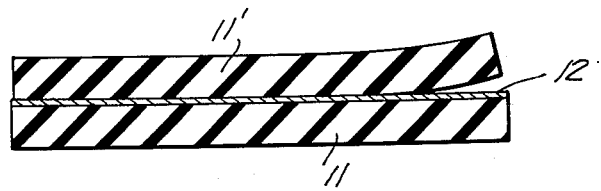
Figure 3:
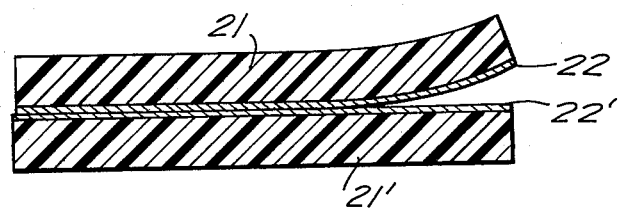

FIG. 1 shows a transverse section of a tubular object coated with the anti-tack composition of the invention, FIG. 2 illustrates in section two sheet materials one of which is coated with the anti-tack composition, and FIG. 3 shows two sheet-like materials in section, both sheets being coated with the anti-tack composition.

Referring now to the drawing, and particularly to FIG. 1, there is shown an extruded tube 1 of unvulcanized rubber which has been passed through an aqueous bath for coating with the anti-tack composition 2 of the invention. This tubular material may now be coiled with the individual turns of the coil touching each other. There will be no danger of turns sticking to each other even after prolonged periods of storage.

It will depend on storage conditions which can usually be readily predicted, whether the coating is applied very thinly or very heavily. It is generally preferred to apply a heavier coating where the tackiness to be counteracted is severe because of the nature of the material, the storage temperature, etc.

FIG. 2 shows two superimposed layers 11 and 11' of unvulcanized rubber sheet of relatively low tackiness either because of its composition, or because the sheets are stored at relatively low temperature. In such a case, it is sufficient that one of the two contacting surfaces be coated with the anti-tack composition 12.

In the embodiment of the invention shown in FIG. 3, both contacting surfaces of superimposed sheets 21, 21' are provided with anti-tack coatings 22 and 22', respectively. This arrangement is illustrative of the application of the anti-tack composition of the invention to very tacky material such as highly plasticized polyvinyl chloride.

The following examples are further illustrative of the anti-tack composition of the present invention, of the method for preparing it, and of the methods preferably used for applying it. It will be understood that the invention is not limited to the examples given.

*Example 1*

560 parts by weight of water are mixed by stirring with 420 parts by weight of sperm oil fatty acids (acid value 214; saponification value 215; iodine value 76.5).

The mixture is heated to approximately 40 to 50° C. and is slowly saponified by addition of 160 parts by weight of a 50% aqueous solution of potassium hydroxide.

As soon as saponification is completed, carboxymethyl cellulose in water-swelled condition is added to the saponification mixture. The carboxymethyl cellulose solution is prepared as follows:

40 parts by weight of sodium-carboxymethyl cellulose of a viscosity of 27 centipoise, and 40 parts by weight of sodium-carboxymethyl cellulose having a viscosity of 260 centipoise are jointly added to 860 parts by weight of water at room temperature, approximately 20° C., and are well mixed. The mixture is left to stand for 12 hours and then becomes a homogeneous solution. It will be appreciated that a solution of carboxymethyl cellulose may be prepared in any other convenient manner and that the method of preparing the solution is not part of the subject matter of this invention.

The soap solution and the swollen carboxymethyl cellulose are intimately mixed by vigorous agitation at a temperature of 40 to 50° C. The mixture is then permitted to cool to room temperature and solidifies into a pasty mass having a composition of 20% sperm oil fatty acids in the form of their potassium salts,
4% sodium salt of carboxymethyl cellulose, balance water.

The pH value of a 10% solution of such a paste in water is approximately 9.8 to 10.9 as measured with platinum-glass electrodes by the electrometric method.

For practical use, the concentrate obtained above is diluted in a ratio of 1:19 with water free from calcium ions. In order to expedite solution, the water is preheated to 30 to 40° C. This mixture is applied to sheets of rubber shortly after they have left the kneader or a set of rollers by brushing on with a brush or by spraying with an air-actuated gun. The sheets of raw rubber may also be simply dipped in a solution. It is then possible to store the sheets in superimposed condition without causing them to stick to each other.

For conditions of extreme tackiness, such as encountered with highly plasticized plastic sheets stored under conditions of high temperature and humidity, it is preferred further to add to the concentrate powdery anti-tack agents substantially insoluble in water, such as talcum, zinc stearate, aluminum stearate, bentonite, or china clay. These powdery materials are preferably added to the warm mixture of soap solution and carboxymethyl cellulose solution while it is under vigorous agitation.

When 100 parts by weight of talcum were added to an anti-tack composition otherwise prepared as stated above, an excellent, stable concentrate was obtained. While the talcum had the expected unfavorable effect on the surface appearance of the coated article, though somewhat mitigated by the smoothness of the film, dusting was entirely obviated.

The stearates and various grades of clay, well known themselves as powdery anti-tack agents, may equally be incorporated in the liquid concentrate in amounts which will readily be determined from the particular conditions for which the material is to be employed.

*Example II*

For use in the extrusion of rubber, 10 kg. of the paste prepared according to Example I, are mixed by stirring with 90 kg. of soft water. The solution is filled into a vat into which extruded non-vulcanized rubber is passed immediately after leaving the extrusion nozzle. The extrudate is then passed from the vat to an area in which warm air is blown over it in order to dry the solution and so treated material, which may be either a solid continuous elongated bar or an extruded hose, will no longer be tacky.

It is a particular advantage of treating extruded rubber with the anti-tack agent of the invention that it is not necessary that the extruded shape be washed after vulcanization, as is commonly the case when talcum is used as a separating means. The vulcanized product not only retains its original configuration and appearance, but its surface is even better and more lustrous than the case would be if the anti-tack agent of the invention had not been employed.

*Example III*

286 parts by weight of water are mixed with 134 parts by weight of triethanolamine. 250 parts by weight of ricinoleic acid (acid value 188; saponification value 190; iodine value 50; hydroxyl content 5.7%) are then gradually added. As soon as saponification is completed, an aqueous solution of sodium salt of carboxymethyl cellulose consisting of 30 parts by weight of the sodium salt and 300 parts by weight of water is mixed with the soap solution. The carboxymethyl cellulose solution is prepared as indicated in Example I. The soap solution and the carboxymethyl cellulose solution are intimately mixed by vigorous agitation at a temperature of 40 to 50° C. The mixture is permitted to cool to room temperature and solidifies into a pasty mass having a composition of 25% ricinoleic acid in the form of its triethanolamine salt,
3% sodium salt of carboxymethyl cellulose, balance water.

The pH value of a 10% solution of this paste in water is approximately 9.8 to 10.8, as measured by the electrometric method by means of platinum-glass electrodes.

For application as an anti-tack agent, 15 kg. of the aforedescribed paste are stirred into 85 kg. of water substantially free of calcium ions. The use of the solution is as described in Example II.

It is a particular advantage of the anti-tack agent of the invention when prepared from ricinoleic acid that the aqueous solutions of anti-tack agent are practically non-foaming. Either a foam will not form at all during spraying, or a foam so formed will collapse rapidly.

*Example IV*

2 kg. of the paste prepared as indicated in Example III are mixed by stirring with 98 kg. of water of extremely low hardness. Finished flat objects of vulcanized rubber such as gaskets are dipped into the aqueous solution. After withdrawal from the solution of the anti-tack agent, the excess liquid is permitted to drain, and the remaining liquid still adhering to the gaskets is permitted to evaporate. Such evaporation may be accelerated by a stream of warm air. Rubber gaskets so treated may safely be stored in superimposed condition without any danger that they may stick to each other. Objects of vulcanized rubber treated with the anti-tack agent of the invention have a particularly pleasing, smooth and glossy surface and have the pure color of the rubber.

*Example V*

434.5 parts by weight of water are mixed with
36.5 parts by weight of n-butylamine, and thereafter are added
100 parts by weight of lauric acid (acid value 276; saponification value 273; iodine value 0). The mixture is well agitated and saponification is permitted to proceed at 80° C.

As soon as saponification is completed, an aqueous solution of the potassium salt of carboxymethyl cellulose is mixed by stirring with the soap solution. The solution of the carboxymethyl cellulose salt is prepared as follows:

30 parts by weight of potassium-carboxymethyl cellulose having a viscosity of 48 cp., and
30 parts by weight of a potassium-carboxymethyl cellulose of a viscosity of 208 cp. are simultaneously added to
400 parts of water at room temperature and the resulting mixture is agitated and permitted to stand for 12 hours.

After this period, a homogeneous solution is obtained.

The soap solution and the carboxymethyl cellulose solution are well mixed at 60° C. by vigorous agitation. The mixture is permitted to cool and forms a soft white paste having a soap content of 10% n-butylamine laurate and a content of potassium-carboxymethyl cellulose of 6%.

This concentrate is made ready for use by stirring 20 kg. of this paste into 100 kg. of water of low calcium hardness. When the resulting solution is employed as an anti-tack agent for uncured rubber sheets as indicated in Example I, the sheets after storage over an extended

*Example VI*

40 parts by weight of sodium hydroxide are dissolved in 320 parts of water. To this solution
200 parts of technical stearic acid (acid value 202; iodine value 5) are gradually added and are saponified at 80° C. with agitation.

The soap solution so produced is mixed at 30 to 40° C. with an aqueous solution of sodium-carboxymethyl cellulose. The carboxymethyl cellulose solution is prepared in the following manner:

20 parts of sodium-carboxymethyl cellulose having a viscosity of 17 cp. and
20 parts of sodium-carboxymethyl cellulose of a viscosity of 402 cp. are jointly added to 400 parts of water at 30° C.

The paste obtained after cooling contains 20% sodium stearate and 4% sodium-carboxymethyl cellulose. The paste is fairly hard and is therefore employed at a concentration of 2%, that is, 2 kg. of paste are dispersed in 100 kg. of water. The resulting solution has an excellent anti-tack effect when employed as indicated in Example IV.

*Example VII*

46.6 parts by weight of a 25% solution of ammonia are mixed with
312 parts of water. To the resulting mixture are added drop by drop
200 parts of oleic acid (acid value 201; iodine value 91.5). Saponification is permitted to proceed at 75° C. and is completed after 1 hour.
20 parts by weight of sodium-carboxymethyl cellulose of a viscosity of 27 cp. and
20 parts of sodium-carboxymethyl cellulose of a viscosity of 260 cp. are jointly and gradually added to
400 parts of water at 60° C. After 12 hours, a homogeneous solution is obtained.

The soap solution and the sodium-carboxymethyl cellulose solution are well mixed at 50° C. When the resulting mixture is permitted to cool, a homogeneous white paste is obtained which contains 20% ammonium oleate and
4% sodium-carboxymethyl cellulose.

The paste may then be diluted to suit the various modes of application contemplated by the invention, such as for example, for the dipping of extruded rubber strands. A perfect anti-tack effect is achieved.

*Example VIII*

400 parts by weight of a mixture of technical cerotic acid and carnaubic acid obtained from Carnauba wax (acid value 145; saponification value 155.3; iodine value 4.8) is gradually added to a mixture of
660 parts water and
68 parts monoethanolamine.

Saponification of the acids is obtained by stirring the solution and heating it to a temperature of 80° C. The resulting soap solution is mixed by stirring with a sodium-carboxymethyl cellulose solution prepared from 3 parts by weight of sodium-carboxymethyl cellulose of a viscosity of 27 cp. and
3 parts by weight of sodium-carboxymethyl cellulose of a viscosity of 260 cp. in
800 parts of water at 50 to 60° C.

When the mixture of soap and sodium-carboxymethyl cellulose solution is permitted to cool, a thick oily liquid is obtained which contains 20% of the mixed fatty acid in the form of the monoethanolamine salts and 3% of the sodium salt of carboxymethyl cellulose.

When an anti-tack agent is to be prepared from this concentrate, 10 kg. of the oily liquid are mixed with 100 kg. of water at 30 to 40° C.

Shapes of rubber and other elastomeric substances may then be brushed, sprayed or treated by immersion in this anti-tack agent. A very good anti-tack effect is obtained and the shapes can readily be separated from each other after prolonged storage.

*Example IX*

300 parts of technical decylic acid (acid value 324; iodine value 2.5) are saponified with
310 parts of dicyclohexylamine in
144 parts of water. The reaction is completed within 4 hours at 80° C.
10 parts of sodium-carboxymethyl cellulose having a viscosity of 27 cp. and
10 parts of sodium-carboxymethyl cellulose of a viscosity of 260 cp. are caused to swell at 30° C. for 12 hours in
200 parts of water.

The soap solution and the solution of sodium-carboxymethyl cellulose are mixed at 40 to 50° C. with agitation. After cooling of the mixture, a homogeneous white paste is obtained. 10 kg. of this paste are dispersed in 100 kg. of water of low hardness and the solution so produced is applied by immersing to extruded rubber shapes.

The extruded shapes do not show any tendency to stick to each other after prolonged storage. The outer surface of the extrudate shows a particularly smooth and glossy surface.

*Example X*

282.5 parts of oleic acid are heated with
149.2 parts of triethanolamine in 800 parts of methanol. The reaction is performed in a closed container equipped with a reflux condenser at 60° C. After 4 hours saponification is complete.
28.25 parts of sodium-carboxymethyl cellulose of a viscosity of 27 cp. and
28.25 parts of sodium-carboxymethyl cellulose of a viscosity of 260 cp. are worked into a paste with 500 parts of methanol and are then mixed by thorough stirring in a mechanical mixing machine with the previously prepared soap solution which has been permitted to cool to room temperature. After a homogeneous mixture is obtained, the methanol is evaporated while stirring is continued. A pasty material is obtained which consists of a substantially dry homogeneous mixture of the amine soap of the oleic acid and of sodium-carboxymethyl cellulose.

For application as an anti-tack agent, 2 kg. of this paste are dissolved in 100 kg. of water by stirring. During this stirring the carboxymethyl cellulose swells. The anti-tack solution which is obtained after complete swelling of the carboxymethyl cellulose has the same effect as a solution produced from a water-bearing paste.

*Example XI*

38 parts by weight of potassium hydroxide are dissolved in
320 parts of water.
200 parts of rape seed oil fatty acid are gradually added to the alkali solution with vigorous agitation.

The saponification reaction is permitted to go to completion, and an aqueous solution of the sodium salt of carboxymethyl cellulose containing 40 parts of the sodium salt in 400 parts of water are mixed with the soap solution. The carboxymethyl cellulose solution is prepared as described in Example I above.

The soap solution and the carboxymethyl cellulose solution are intimately mixed by vigorous agitation at a temperature of 40 to 50° C. whereupon the mixture is permitted to cool to room temperature. A pasty mass is obtained which has a composition of 20% rape seed oil fatty acid in the form of its potassium salt and 4% sodium salt of carboxymethyl cellulose, balance water.

For application as an anti-tack agent for elastomerics 10 parts of the paste described above are stirred into 100 parts of water. The resulting aqueous solution is employed as indicated above in Example II.

*Example XII*

56 parts of potassium hydroxide are dissolved in 304 parts of water in a kettle equipped with stirring apparatus. The solution is heated to 60 to 70° C. and 200 parts of lauric acid (acid value 276; saponification value 273) are gradually added while stirring is continued.

When saponification is completed, the solution is permitted to cool to a temperature of 40° C. 440 parts of a sodium-carboxymethyl cellulose solution produced as indicated above in Example VII are then added to the soap solution with mechanical agitation. The white paste resulting from cooling of the mixture is eminently suitable as an anti-tack agent for plasticized polyvinyl chloride when diluted with water.

Foils having substantially a composition of 60 parts of polyvinyl chloride and 40 parts of dibutylphthalate are led directly from the calender into a vat containing a dilute solution of the paste prepared as indicated above and are thereafter dried with warm air. They can then be rolled up immediately while still warm, and can also be stacked. No sticking of the several layers of superimposed plasticized polyvinyl chloride is observed. Even after several months, it is possible to separate the foils readily from each other. They have a smooth, clear, glossy surface.

It will be appreciated that the anti-tack effect of solutions of the anti-tack agent of the invention is not limited to any particular elastomeric material nor to any plasticizer contained therein.

Excellent results have been obtained for example, with polyvinyl chloride compositions containing variable amounts of such plasticizing materials as ethylhexyl phthalate, dioctyl phthalate, dioctyl adipate, tricresyl phosphate, etc. or mixtures of these plasticizers.

Non-vulcanized rubber and highly plasticized polyvinyl chloride material are examples of polymeric substances which present particularly severe problems of tackiness and adhesion. It will be understood that the anti-tack composition of the invention is equally beneficial when employed with other plastic or elastomeric materials which show less extreme conditions of tackiness, and that it will be of assistance in materials which may be even tackier than those mentioned in the above examples.

While the invention has been described with particular reference to specific embodiments, it is to be understood that it is not limited thereto, but is to be construed broadly and restricted solely by the scope of the appended claims.

What is claimed is:

1. A water-soluble anti-tack composition for preventing adhesion of contacting surfaces at least one of which is of adherent quality, said composition consisting essentially of a mixture of at least one water-soluble salt of a fatty acid having between 8 and 30 carbon atoms, and a mixture of at least two water-soluble salts of carboxymethyl cellulose, said latter mixture consisting of substantially equal proportions of at least one carboxymethyl cellulose salt having a viscosity of between about 15–50 centipoise and at least one carboxymethyl cellulose salt having a viscosity of between about 150–500 centipoise, said salts being mixed in such proportions that the ratio of said fatty acid salt expressed in parts by weight of fatty acid equivalents therein to said combined salts of carboxymethyl cellulose is substantially between 15:1 and 5:3.

2. A water-soluble anti-tack composition for preventing adhesion of contacting surfaces at least one of which is of adherent quality, said composition consisting essentially of a mixture of at least one water-soluble salt of a cation selected from the group consisting of the alkali metals, ammonium, amines and substituted amines, and a fatty acid having between 8 and 30 carbon atoms, and a mixture of at least two water-soluble salts of carboxymethyl cellulose, said letter mixture consisting of substantially equal proportions of at least one carboxymethyl cellulose salt having a viscosity of between about 15–50 centipoise and at least one carboxymethyl cellulose salts having a viscosity of between about 150–500 centipoise, said salts being mixed in such proportions that the ratio of said fatty acid salt expressed in parts by weight of fatty acid equivalents therein to said combined salts of carboxymethyl cellulose is substantially between 15:1 and 5:3.

3. A water-soluble anti-tack composition for preventing adhesion of contacting surfaces at least one of which is of adherent quality, said composition consisting essentially of a mixture of at least one water-soluble salt of a fatty acid having between 8 and 30 carbon atoms, and a mixture of at least two water-soluble salts of carboxymethyl cellulose, said latter mixture consisting of substantially equal proportions of at least one carboxymethyl cellulose salt having a viscosity of between about 15–50 centipoise and at least one carboxymethyl cellulose salt having a viscosity of between about 150–500 centipoise, said salts being mixed in such proportions that the ratio of said fatty acid salt expressed in parts by weight of fatty acid equivalents therein to said combined salts of carboxymethyl cellulose is substantially between 5:1 and 7:1.

4. A water-soluble anti-tack composition for preventing adhesion of contacting surfaces at least one of which is of adherent quality, said composition consisting essentially of a mixture of at least one water-soluble salt of a fatty acid having between 8 and 30 carbon atoms, and a mixture of at least two water-soluble salts of carboxymethyl cellulose, said latter mixture consisting of substantially equal proportions of at least one carboxymethyl cellulose salt having a viscosity of about 27 centipoise and at least one carboxymethyl cellulose salt having a viscosity of about 260 centipoise, said salts being mixed in such proportions that the ratio of said fatty acid equivalents therein to said combined salts of carboxymethyl cellulose is substantially between 15:1 and 5:3.

5. A concentrated, liquid anti-tack composition for preventing adhesion of contacting surfaces at least one of which is of adherent quality, said composition consisting essentially of an aqueous dispersion of at least one water-soluble salt of a fatty acid having between 8 and 30 carbon atoms, and a mixture of at least two water-soluble salts of carboxymethyl cellulose, said latter mixture consisting of substantially equal proportions of at least one carboxymethyl cellulose salt having a viscosity of between about 15–50 centipoise and at least one carboxymethyl cellulose salt having a viscosity of between about 150–500 centipoise, said salts being mixed in such proportions that the ratio of said fatty acid salt expressed in parts by weight of fatty acid equivalents therein to said combined salts of carboxymethyl cellulose is substantially between 15:1 and 5:3, said carboxymethyl cellulose salts and said fatty acid salt expressed as its fatty acid equivalent forming between 15 and 35% of the weight of said aqueous dispersion.

6. An anti-tack composition for preventing adhesion between contacting surfaces at least one of which is of adherent equality, said composition consisting essentially of an aqueous solution of at least one water-soluble salt of a cation selected from the group consisting of the alkali metals, ammonium, amines and substituted amines, and a fatty acid having between 8 and 30 carbon atoms, and a mixture of at least two water-soluble salts of carboxymethyl cellulose, said latter mixture consisting of substantially equal proportions of at least one carboxymethyl cellulose salt having a viscosity of about 27 centipoise and at least one carboxymethyl cellulose salt having a viscosity of about 260 centipoise, said salts being mixed in such proportions that the ratio of said fatty acid salt expressed in parts by weight of fatty acid equivalents therein to said combined salts of carboxymethyl cellulose is substantially between 5:1 and 7:1, said carboxymethyl cellulose salts and said fatty acid salt expressed as its fatty acid equivalent forming between 0.3 and 7.0% by weight of said aqueous solution.

7. A water-soluble anti-tack composition for preventing adhesion of contacting surfaces at least one of which is of adherent quality, said composition consisting essentially of water containing a mixture of at least one water-soluble salt of a fatty acid having between 8 and 30 carbon atoms, and a mixture of at least two water-soluble salts of carboxymethyl cellulose, said latter mixture consisting of substantially equal proportions of at least one carboxymethyl cellulose salt having a viscosity of between about 15–50 centipoise and at least one carboxymethyl cellulose salt have a viscosity of between about 150–500 centipoise, said salts being mixed in such proportions that the ratio of said fatty acid salt expressed in parts by weight of fatty acid equivalents therein to said combined salts of carboxymethyl cellulose is substantially between 15:1 and 5:3.

8. A water-soluble anti-tack composition for preventing adhesion of contacting surfaces at least one of which is of adherent quality, said composition consisting essentially of water containing a mixture of at least one water-soluble salt of a fatty acid having between 8 and 30 carbon atoms, and a mixture of at least two water-soluble salts of carboxymethyl cellulose, said latter mixture consisting of substantially equal proportions of at least one carboxymethyl cellulose salt having a viscosity of between about 15–50 centipoise and at least one carboxymethyl cellulose salt having a viscosity of between about 150–500 centipoise, said salts being dissolved in said water in a concentration of between 0.2 and 6.0% of fatty acid equivalent of said fatty acid salt and between 0.1 and 1.0% of said carboxymethyl cellulose salts.

9. A water-soluble anti-tack composition for preventing adhesion of contacting surfaces at least one of which is of adherent quality, said composition consisting essentially of water containing a mixture of at least one water-soluble salt of a fatty acid having between 8 and 30 carbon atoms, and a mixture of at least two water-soluble salts of carboxymethyl cellulose, said latter mixture consisting of substantially equal proportions of at least one carboxymethyl cellulose salt having a viscosity of between about 15–50 centipoise and at least one carboxymethyl cellulose salt having a viscosity of between about 150–500 centipoise, said salts being dissolved in said water in a concentration of between 2 and 4% of fatty acid equivalent of said fatty acid salt and between 0.3 and 0.8% of said carboxymethyl cellulose salts.

10. A water-soluble anti-tack composition for preventing adhesion of contacting surfaces at least one of which is of adherent quality, said composition consisting essentially of an aqueous dispersion of at least one water-soluble salt of a fatty acid having between 8 and 30 carbon atoms, a mixture of at least two water-soluble salts of carboxymethyl cellulose, said latter mixture consisting of substantially equal proportions of at least one carboxymethyl cellulose salt having a viscosity of between about 15–50 centipoise and at least one carboxymethyl cellulose salt having a viscosity of between about 150–500 centipoise, said salts being mixed in such proportions that the ratio of said fatty acid salt expressed in parts by weight of fatty acid equivalents therein to said combined salts of carboxymethyl cellulose is substantially between 15:1 and 5:3, said aqueous dispersion containing furthermore an anti-tack agent substantially insoluble in water and selected from the group consisting of talcum, zinc stearate, aluminum stearate and clay.

11. In a process of manufacturing shaped articles of a material the surface of which has adherent qualities, the step of applying to a surface of said article a coating consisting essentially of a mixture of at least one water-soluble salt of a fatty acid having between 8 and 30 carbon atoms, and a mixture of at least two water-soluble salts of carboxymethyl cellulose, said latter mixture consisting of substantially equal proportions of at least one carboxymethyl cellulose salt having a viscosity of between about 15–50 centipoise and at least one carboxymethyl cellulose salt having a viscosity of between about 150–500 centipoise, said salts being mixed in such proportions that the ratio of said fatty acid salt expressed in parts by weight of fatty acid equivalents therein to said combined salts of carboxymethyl cellulose is substantially between 15:1 and 5:3, whereby the thus coated surface of said article may be readily separated from contact with a surface of a material to which it would adhere without said coating.

12. In a process of continuously extruding shaped articles of rubber and synthetic polymeric material the surface of which has adherent qualities, the step of passing the extruded material through an aqueous anti-tack composition consisting essentially of water having dissolved therein at least one water-soluble salt of a fatty acid having between 8 and 30 carbon atoms, and a mixture of at least two water-soluble salts of carboxymethyl cellulose said latter mixture consisting of substantially equal proportions of at least one carboxymethyl cellulose salt having a viscosity of between about 15–50 centipoise and at least one carboxymethyl cellulose salt having a viscosity of between about 150–500 centipoise, said salts being mixed in such proportions that the ratio of said fatty acid salt expressed in parts by weight of fatty acid equivalents therein to said combined salts of carboxymethyl cellulose is substantially between 15:1 and 5:3, so as to adhere a layer of said aqueous anti-tack composition to the surface of said extruded material; evaporating at least the major portion of the water of said layer so as to form a coating consisting of said salts of said anti-tack composition on said surface of said extruded material, whereby said thus coated surface may be readily separated from contact with a surface of material to which it would adhere without said coating.

13. A shaped article made of a material selected from the group consisting of rubber and synthetic polymeric compounds and the surface of which has adherent qualities, said article including a surface portion; and a coating substantially covering said surface portion, said coating consisting of an anti-tack composition consisting essentially of at least one water-soluble salt of a fatty acid having between 8 and 30 carbon atoms, and a mixture of at least two water-soluble salts of carboxymethyl cellulose, said latter mixture consisting of substantially equal proportions of at least one carboxymethyl cellulose salt having a viscosity of between about 15–50 centipoise and at least one carboxymethyl cellulose salt having a viscosity of between about 150–500 centipoise, said salts being mixed in such proportions that the ratio of said fatty acid salt expressed in parts by weight of fatty acid equivalents therein to said combined salts of carboxymethyl cellulose is substantially between 15:1 and 5:3.

14. A shaped article made of a material selected from the group consisting of rubber and synthetic polymeric compounds and the surface of which has adherent qualities said article including a surface portion; and a coating substantially covering said surface portion, said coating consisting of an anti-tack composition consisting essentially of at least one water-soluble salt of a fatty acid having between 8 and 30 carbon atoms, and a mixture of at least two water-soluble salts of carboxymethyl cellulose, said latter mixture consisting of substantially equal proportions of at least one carboxymethyl cellulose salt having a viscosity of between about 15–50 centipoise and at least one carboxymethyl cellulose salt having a viscosity of between about 150–500 centipoise, said salts being mixed in such proportions that the ratio of said fatty acid salt expressed in parts by weight of fatty acid equivalents therein to said combined salts of carboxymethyl cellulose is substantially between 15:1 and 5:3, said coating also containing an anti-tack agent substantially insoluble in water and selected from the group consisting of talcum, zinc stearate, aluminum stearate and clay.

References Cited in the file of this patent

UNITED STATES PATENTS

| | | |
|---|---|---|
| 2,147,312 | Partridge | Feb. 14, 1939 |
| 2,202,741 | Maxwell | May 28, 1940 |
| 2,354,979 | Almy | Aug. 1, 1944 |
| 2,440,626 | Young et al. | Apr. 27, 1948 |